United States Patent [19]

Kiyozumi

[11] 3,847,114

[45] Nov. 12, 1974

[54] APPARATUS FOR VAPOR DEPOSITION AND ION IMPLANTATION

[75] Inventor: Kentaro Kiyozumi, Ise, Japan

[73] Assignee: Ise Electronics Corporation, Ise, Japan

[22] Filed: June 1, 1972

[21] Appl. No.: 258,568

[30] Foreign Application Priority Data
June 9, 1971 Japan.............................. 46-41317
July 10, 1971 Japan.............................. 46-51238

[52] U.S. Cl. ............................................. 118/49.1
[51] Int. Cl. ............................................. C23c 13/12
[58] Field of Search ......... 118/49.1, 49.5; 117/93.3; 219/121 EB

[56] References Cited
UNITED STATES PATENTS

| | | | |
|---|---|---|---|
| 3,192,892 | 7/1965 | Hanson et al...................... | 118/49.1 |
| 3,325,178 | 6/1967 | DeAngelis........................ | 118/49.5 X |
| 3,329,601 | 7/1967 | Mattox.......................... | 118/49.5 UX |
| 3,419,487 | 12/1968 | Robbins et al.................. | 117/93.3 X |
| 3,434,894 | 3/1969 | Gale............................ | 118/49.5 UX |
| 3,528,387 | 9/1970 | Hamilton........................ | 118/49.1 |
| 3,695,910 | 10/1972 | Louderback et al............. | 117/93.3 X |

*Primary Examiner*—Morris Kaplan
*Attorney, Agent, or Firm*—Dike, Bronstein, Roberts, Cushman & Pfund

[57] ABSTRACT

An apparatus for manufacturing an electroluminous element provides for alternately or simultaneously depositing a phosphor film upon an electrode film formed on a substrate and injecting ions of an activator together with or without the ions of a coactivator into the vapour deposited phosphor film. The source of the injection ions is an electrically heated source of electrons which heats solid activator material in a reservoir associated therewith to which a gaseous coactivator may be added to react with the vaporized activator.

3 Claims, 1 Drawing Figure

PATENTED NOV 12 1974 3,847,114
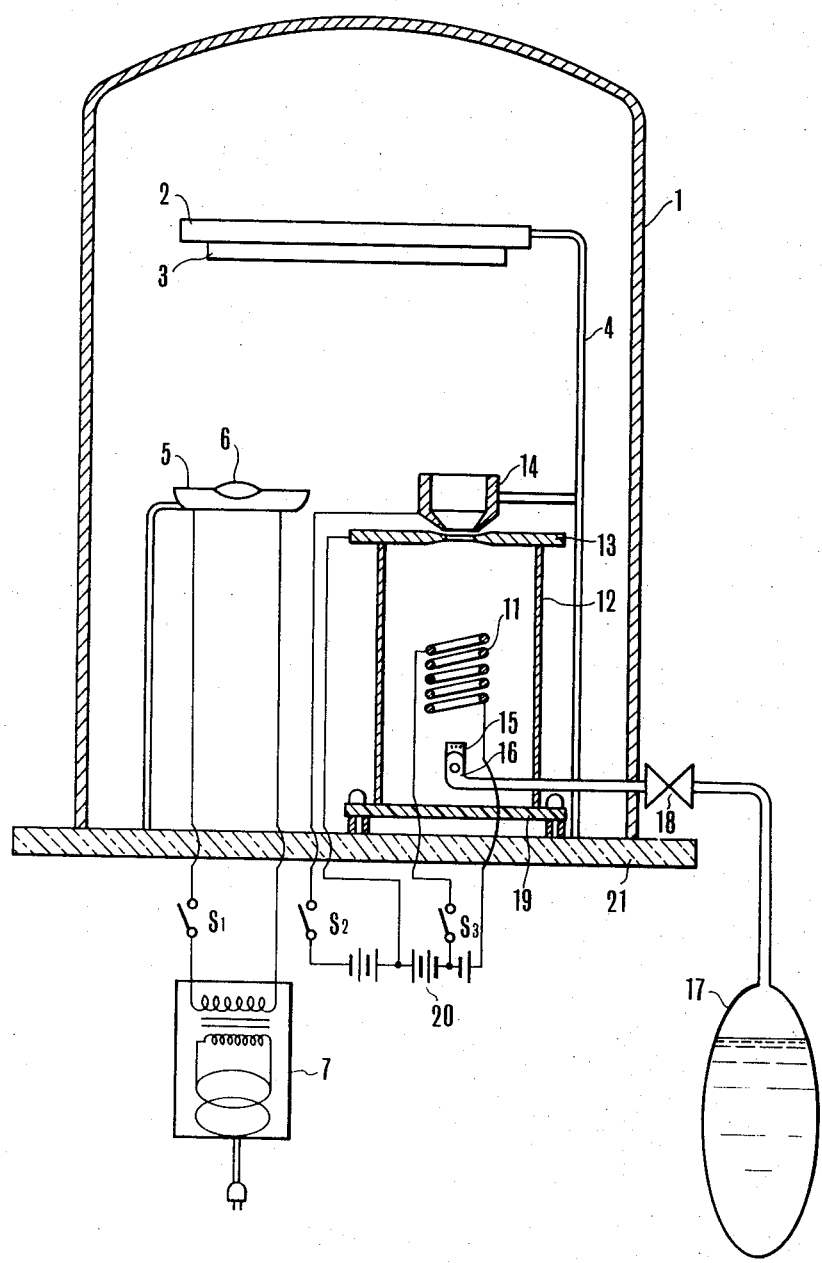

APPARATUS FOR VAPOR DEPOSITION AND ION IMPLANTATION

BACKGROUND OF THE INVENTION

This invention relates to a method of manufacturing an electroluminescence element (EL) which luminesces under electric field.

With the recent trend of manufacturing electronic devices as solid state elements and with the recent development of the information industry, the ability and application of the EL for display purposes have become important. Conventional ELs may be classified into two types, the diffused type wherein a phosphor is diffused into an organic dielectric such as a resin, and the vapour deposited type wherein the phosphor is vapour deposited upon an electroconductive glass, Nesa glass for example. The latter is more advantageous than the former in that it can operate at lower voltages yet emanates brighter light. However, the vapour deposited type EL is rather difficult to manufacture because the composition of the phosphor changes during the vapour deposition step. In other words, the phosphor exhibits different properties before and after vapour deposition. Thus for example, in a phosphor consisting of ZnS:Cu, Cl the ratio between Cu and Cl which act as the activator and the coactivator, respectively, decreases after vapour deposition thus imparing the luminous efficiency of the EL. To eliminate this difficulty, it has been the usual practice to rely upon an additional step, called as the embedding step, wherein the vapour deposited EL is embedded in a phosphor containing a higher ratio of the activator and coactivator, that is Cu and Cl, and is then heat treated to diffuse Cu and Cl into the vapour deposited film of the phosphor. However, with such a heat diffusion process, the quantities of the diffused activator and coactivator are not sufficient to improve the characteristic of the finished EL to the desired extent. In addition to the embedding process, there are many methods for increasing the contents of the activator and coactivator, but each of these methods is not satisfactory because they utilize a phenomenon caused by the heat diffusion.

With recent development in the art of semiconductor bodies it became possible to manufacture new types of semiconductor bodies and various impurity semiconductor bodies, which could not have been realized with the heat diffusion method, by ion injection technique according to which atoms of various impurities are injected into the semiconductor bodies. For example, in the case of silicon carbide, although it is extremely difficult to incorporate impurities by heat diffusion it is easy to incorporate them by ion injection technique. According to this technique, the atoms of the impurity to be incorporated are ionized to form charged particles which are accelerated in electric field to be imparted with a high kinetic energy whereby the accelerated atoms are caused to collide against the semiconductor body and diffuse therein. In this manner, the desired impurity is injected into the crystal of the semiconductor. According to this method, it is possible to inject the impurity into the semiconductor material regardless of the physical or chemical characteristic thereof. With increased ion energy, the depth of the injection of the impurity into an amorphous semiconductor body is substantially proportional to the energy of acceleration and the quantity of the injected impurity is proportional to the current and the interval of time up to an acceleration voltage of about 40 KV. When the semiconductor body injected with the impurity as above described is heat treated, the impurity is converted into charge carriers acting as the luminous centers thereby producing an ordinary semiconductor body.

SUMMARY OF THE INVENTION

It is an object of this invention to provide an apparatus an improved electroluminescence element capable of operating at a high efficiency by taking advantages of both the vapour deposition method and the ion injection method.

According to one aspect of this invention there is provided an improved apparatus for practicing a method of manufacturing an electroluminescence element comprising the steps of alternately repeating vapour deposition of a phosphor film upon an electrode film formed on a substrate, and injection of the ions of an activator together with or without the ions of a coactivator into the vapour deposited film.

According to another aspect of this invention there is provided an improved apparatus for practicing a method of manufacturing an electroluminescence element comprising the step of simultaneously carrying out vapour deposition of a phosphor film on an electrode film formed on a substrate and injection of the ions of an activator together with or without the ions of a coactivator into the vapour deposited phosphor film.

The resulting electroluminescence element manufactured by either method is heat treated to convert the injected ions into luminous centers.

According to still another aspect of this invention there is provided apparatus for manufacturing an electroluminescence element comprising an evacuated vessel, means to support a substrate with an electrode film in the evacuated vessel, means to evaporate and vapour deposit a phosphor film onto the electrode film, a source of ions of an activator, said source being also contained in the evacuated vessel and including a cylinder, a heater contained in the cylinder which operates to emit electrons, a source of the activator disposed to be heated by the heater, a perforated anode electrode closing the cylinder and a cylindrical extraction electrode arranged to cooperate with the anode electrode to extract ions of the activator thereby injecting the ions into the vapour deposited film, and means for electrically energizing the evaporating means and the source of ions.

BRIEF DESCRIPTION OF THE DRAWING

In the accompanying drawing a single FIGURE shows a diagrammatic longitudinal sectional view of one example of the apparatus utilized to manufacture electroluminescence elements according to the method of this invention.

DESCRIPTION OF THE PREFERRED EMBODIMENTS

The vapour deposition apparatus shown in the accompanying drawing comprises a bell jar 1 which is evacuated to a high vacuum by means of a vaccum pump, not shown. A substrate 3 to be vapour deposited, a sheet of electroconductive glass for example, is mounted on the lower side of a support 2 which is supported in the upper portion of bell jar 1 by means of a pedestal 4. If desired, the support 2 may be provided with an electric heater (not shown) for heating the substrate to a temperature of from 800° to 1,000° C. A quantity of a phosphor 6 is contained in an evaporation boat 5 which is equipped with an electric heater (not shown) for heating and evaporating the phosphor 6. The heater is energized from a source of supply 7 through a switch $S_1$.

In the bell jar, there is also contained an ion source comprising a heater 11 of tantalum or molybdenum contained in a quartz tube 12, a perforated anode electrode 13 and a cylindrical extractor electrode 14 coaxially mounted above the anode electrode 13 for extracting ions from a plasma through the perforation of the anode. A pipe 16 adapted to contain a metal oxide, such as an oxide of copper, is placed beneath heater 11 and is connected to a reservoir 17 containing $CCl_4$ via a valve 18. A source of supply 20 is provided to energize heater 11 and electrodes 13 and 14 of the ion source via switches $S_3$ and $S_2$, respectively. The bell jar 1, support 2 and boat 5 are supported by a platform 21 and the ion source is supported by a base plate 19.

To form an electroluminescent phosphor film on an insulator substrate 3 having an electrode film coated on the surface thereof such as a Nesa glass sheet, after mounting the substrate 3 on the support 2 and charging phosphor 6 in the evaporation boat 5, the interior of the bell jar 1 is evacuated to a high vacuum. Then the evaporation boat 5 is heated to cause the phosphor 6 to evaporate and deposit on the electrode film, not shown, formed on the substrate 3 in a manner well known in the art. Then switch $S_1$ is opened to deenergize the electric heater for the evaporation boat 5 and switches $S_2$ and $S_3$ are closed to operate the ion source. As a consequence, heater 11 is heated to a temperature sufficient to emit electrons. When pipe 16 is heated to a sufficiently high temperature, valve 18 is opened to supply $CCl_4$ to the heated copper oxide 15 from the reservoir 17. Then the $CCl_4$ reacts with the copper oxide to form a chloride of copper which fills the quartz tube 12 and is ionized by the electrons emitted from heater 11. Since a particle or electron accelerating voltage of from −10 to −40KV is impressed upon anode electrode 13 and extraction electrode 14 from source 20 the ions are extracted from the cylinder 12 into the bell jar 1 through the perforation of the anode electrode 13 and the cylindrical extraction electrode 14. The diverted beam of the ions collides upon the phosphor film formed on the surface of substrate 3. Thus the ions are injected into the phosphor film. After stopping the ion injection step described above the phosphor deposition step is repeated followed by an additional ion injection step. In this manner, a desired electroluminescent phosphor film can be formed by alternately carrying out several times the vapour deposition step and the ion injection step.

Instead of alternately performing the vapour deposition step and the ion injection step, it is also possible to carry out these two steps simultaneously in which case switches $S_1$, $S_2$ and $S_3$ are closed simultaneously to operate both of the vapour deposition device and the ion source.

The resulting electroluminescent phosphor film is then heat treated to convert the injected ions into luminescence centers. Although the temperature of heat treatment varies dependent upon the type of the phosphor and the activator and or coactivator used, in the case of ZnS:Cu, Cl, a temperature of about 650° – 700° C is preferred. An electrode film is then applied on the phosphor film by vacuum deposition technique, for example, and lead wires are connected to this electrode film and to the electrode film firstly applied onto the substrate.

It was found that the above described method of forming metal ions utilized for the ion injection step by ionizing chloride of metal produced by the chemical reaction of a metal oxide is more efficient than the method of directly ionizing an elementary metal.

Furthermore, although in the foregoing description Cu was used as the activator and Cl as the coactivator, it should be understood that it is also possible to use other activators and coactivators and that in some cases only the activator can be used.

According to this invention, it is possible to inject into an electroluminescent phosphor film a sufficient quantity of an activator together with or without a coactivator which could never have been attained by heat diffusion technique thus forming an electroluminescent phosphor film or body containing a large number of luminous centers and hence one that can operate at a high efficiency. It is also possible to readily control the quantity of the ions injected or the number of luminous centers by adjusting the heating current and the operating time of the heater or electron emitter 11.

While the invention has been shown and described in terms of specific embodiments thereof it should be understood that the invention is not limited to these embodiments and that many changes and modifications will occur to one skilled in the art without departing from the true spirit and scope of the invention as defined in the appended claims.

What is claimed is:

1. Apparatus for manufacturing an electroluminescence element comprising an evacuated vessel, means to support a substrate formed with an electrode film in said vessel, means to evaporate and vapour deposit a phosphor film onto said electrode film, a source of ions for implantation into said film said source being also contained in said evacuated vessel and including a cylinder, a heater contained in said cylinder which operates to emit electrons, means for holding a solid activator disposed to be heated by said heater, means for admitting gaseous activator to said solid activator and disposed to be heated therewith, a perforated anode electrode closing said cylinder, and a cylindrical extraction electrode arranged to cooperate with said anode electrode to extract ions derived from at least one said activator thereby injecting said ions into said vapour deposited phosphor film, and means for electrically energizing said evaporating means and said source of ions.

2. The apparatus according to claim 1 wherein said source of ions generates the ions derived from a chemical reaction between said solid activator and said gaseous activator.

3. The apparatus according to claim 1 wherein said energizing means comprises independent switches for said evaporating means and for said source of ions adapted to be operated simultaneously or alternately.

* * * * *